United States Patent
Axline

(10) Patent No.: US 6,577,266 B1
(45) Date of Patent: Jun. 10, 2003

(54) TRANSPONDER DATA PROCESSING METHODS AND SYSTEMS

(75) Inventor: Robert M. Axline, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/977,841

(22) Filed: Oct. 15, 2001

(51) Int. Cl.[7] .............................................. G01S 13/76
(52) U.S. Cl. ............................. 342/42; 342/44; 342/51; 342/82
(58) Field of Search ............................. 342/42, 44, 45, 342/50, 51, 60, 82, 83, 84, 159, 162, 195

(56) References Cited

U.S. PATENT DOCUMENTS

| 3,593,139 A | * | 7/1971 | Hershberg ................... 455/20 |
| 5,424,743 A | | 6/1995 | Ghiglia et al. |
| 5,486,830 A | | 1/1996 | Axline et al. |
| 5,497,158 A | | 3/1996 | Schmid et al. |
| 5,508,705 A | * | 4/1996 | Spiess .......................... 342/44 |
| 5,608,404 A | | 3/1997 | Burns et al. |
| 5,663,720 A | | 9/1997 | Weissman |
| 5,767,802 A | | 6/1998 | Kosowsky et al. |
| 5,821,895 A | | 10/1998 | Hounam et al. ............... 342/25 |
| 5,926,125 A | | 7/1999 | Wood ........................... 342/25 |
| 6,081,222 A | * | 6/2000 | Henkel et al. ................. 342/45 |
| 2002/0063622 A1 | * | 5/2002 | Armstrong et al. ...... 340/10.31 |

FOREIGN PATENT DOCUMENTS

GB         2268031 A    * 12/1993

* cited by examiner

Primary Examiner—John B. Sotomayor
(74) Attorney, Agent, or Firm—George H. Libman

(57) ABSTRACT

This invention is a radar/tag system where pulses from a radar cause a tag (or transponder) to respond to the radar. The radar, along with its conventional pulse transmissions, sends a reference signal to the tag. The tag recovers the reference signal and uses it to shift the center frequency of the received radar pulse to a different frequency. This shift causes the frequencies of the tag response pulses to be disjoint from those of the transmit pulse. In this way, radar clutter can be eliminated from the tag responses. The radar predicts, to within a small Doppler offset, the center frequency of tag response pulses. The radar can create synthetic-aperture-radar-like images and moving-target-indicator-radar-like maps containing the signature of the tag against a background of thermal noise and greatly attenuated radar clutter. The radar can geolocate the tag precisely and accurately (to within better than one meter of error). The tag can encode status and environmental data onto its response pulses, and the radar can receive and decode this information.

20 Claims, 12 Drawing Sheets

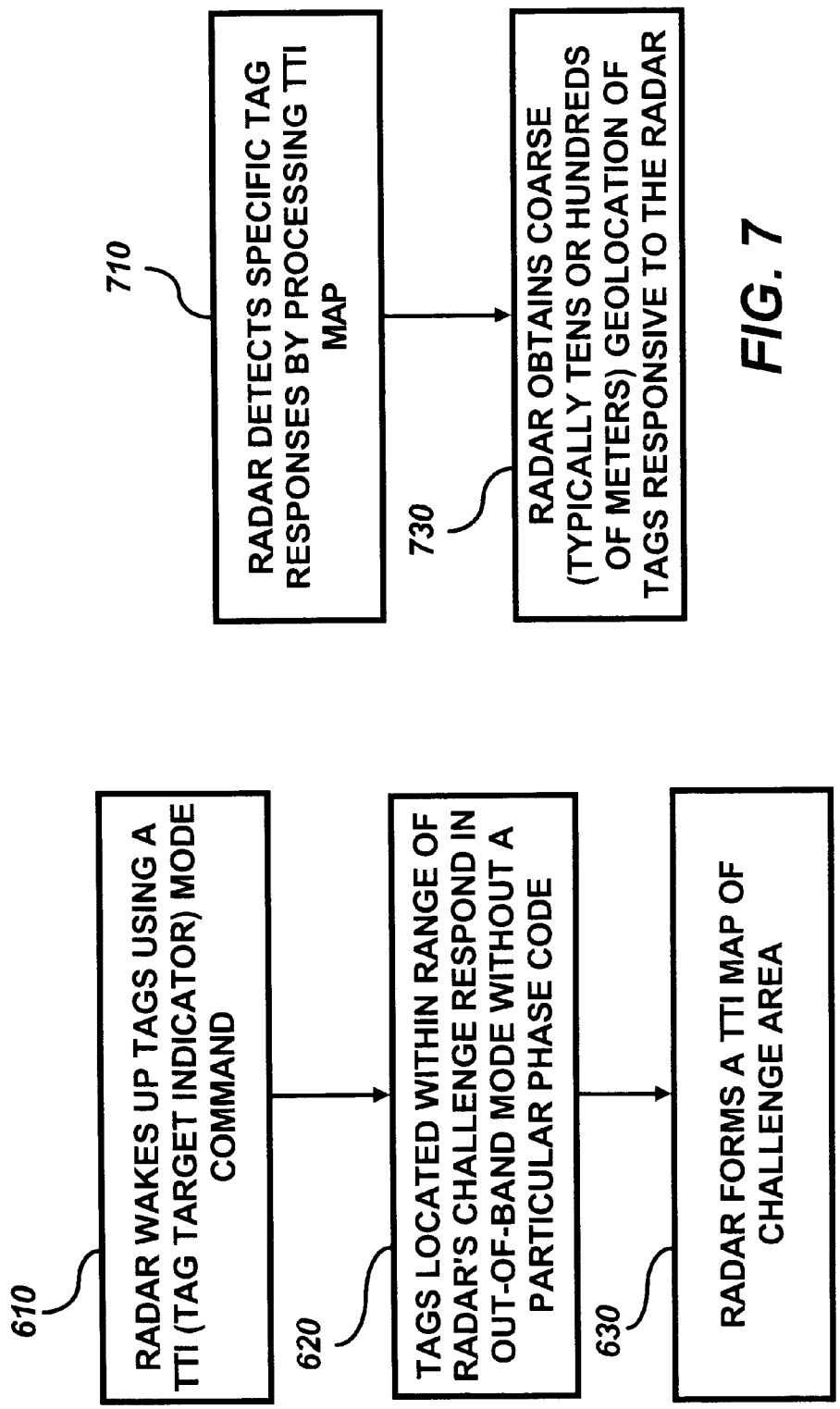

TRANSPONDER DATA PROCESSING METHODS AND SYSTEMS

STATEMENT OF GOVERNMENT INTEREST

The U.S. Government has rights in this invention pursuant to Contract DE-AC04-94AL85000 between Sandia Corporation and the U.S. Department of Energy.

BACKGROUND OF THE INVENTION

1. Technical Field of the Invention

The present invention is generally related to the design and use of transponders (i.e., tags). The present invention is also related to methods and systems for remotely determining the location of tags. The present invention is also related to methods and systems for remotely communicating with tags. More particularly, the present invention is related to radar-assisted location of and communication with tags to obtain data.

2. Background

It is well known that the combination of transponder and radar-signal-processing technique can allow for the geolocation of the tag and uplinking of data from the tag. U.S. Pat. No. 5,486,830, issued Jun. 23, 1996 to R. Axline, describes such methods and systems. U.S. Pat. No. 5,486,830 describes a basic concept of initially locating the tag in a "geographical location" mode and then uplinking data from the tag in an "uplink communications" mode. The patent also describes how suppression of radar clutter can be obtained. Finally, the patent describes details of the structure of the phase-coded signals that the tag returns to the radar, as well as the method the radar uses to process the returned signals (echoes).

While U.S. Pat. No. 5,486,830 provides a useful description of phase-code signaling methods, radar-signal-processing techniques, determining tag geolocation, and tag data-uplinking, a problem in the art surrounding clutter suppression still persists. U.S. Pat. No. 5,486,830 discusses communication between a tag and radar at a common frequency with unique methods directed to the suppression of stationary clutter energy, accomplished primarily via tag modulation and radar processing. The present inventor has developed several "in-band" frequency modes since U.S. Pat. No. 5,486,830 issued. In this context, the term "in-band" denotes the meaning that retransmitted signals coming from the tag reside in the same band of frequencies as the band occupied by the original radar pulse. These developments mitigate the effects of clutter on a system's ability to image the tag or uplink data from it. Yet, adequate clutter reduction still prevails as the dominant problem in radar-tag communications.

Based on the foregoing, the present inventor has found that quality limitations in radar-tag communication can be overcome using what may be now be referred to as "out-of-band" frequency communications techniques, which will be further described herein.

SUMMARY OF THE INVENTION

In order to address the shortcomings of the prior art, the present invention provides improved systems and methods for geolocating and decoding data from tags.

Accordingly, it is a feature of the present invention to enable radar to transmit a very accurate reference frequency that a receiving tag can utilize as described in the following paragraph.

The reference frequency is embedded as information into a pulse signal transmitted by radar. The tag can extract the reference frequency from the radar pulses and use it to develop a second "offset" frequency, based on the reference frequency. The offset frequency is known to within a small Doppler offset frequency by receiving radar (which can also be the transmitting radar).

In accordance with another aspect of the present invention, a tag is provided having the means to receive radar pulses containing reference frequency information; determine a second, offset frequency; translate the center frequency of the radar pulse by an amount equal to the determined offset; modulate, pulse by pulse, the electrical phase of each translated pulse; and transmit a geolocation sequence and/or tag data for receipt by a radar.

Data obtained from tags (tag data) can include, for example, information regarding the environment surrounding the tag, tag-related internal or operational data and/or messages associated with the tag's location.

In employing the "out-of-band" communication technique, the second, offset frequency, should be chosen to be sufficiently large that the frequency spectrum of the pulse signals retransmitted by the tag do not overlap the frequency spectrum of the radar pulse originally transmitted by the radar.

One primary advantage of the out-of-band function is that stationary clutter coming from passive scatterers in the radar scene is nearly completely removed from the processed echo, so that the transponding tag echoes need only compete with thermal noise, and not the clutter.

A second and novel benefit of the out-of-band function, as described herein, is that the radar will be able to geolocate the tag with an accuracy and precision commensurate with that obtainable by a state of the art synthetic aperture radar (SAR); e.g., precision of a fraction of a meter and accuracy on the order of a few meters. The out-of-band tag system of the invention achieves this accuracy and precision while also effectively suppressing all stationary radar clutter.

The above and other aspects of the invention are achieved as will now be further described. The present invention discloses methods and systems, including program products thereof, which enable both accurate and precise geolocation of tags and uplinking of data from tags. A system for out-of-band communication between radars and tags includes a tag receiver for receiving radar pulses, at least one processor for processing data captured from a sequence of radar pulses and at least one transmitter for transmitting tag data back to a radar. A tag can include in-band and/or out-of-band modes. In an "out-of-band" mode, the tag can transmit tag data to the radar utilizing a frequency band that does not overlap with radar pulse frequencies. One method for transmitting tag data to a radar includes steps of receiving a radar pulse signal at a tag, very accurately translating the radar pulse signal to an out-of-band center frequency, and transmitting tag data back to the radar at the out-of-band frequency. A radar, given the teaching of the present invention, is capable of tuning its receiver to a frequency different from its pulse transmit frequency, thus allowing the radar to receive and process the out-of-band tag responses.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 6 illustrates a flow chart of operations illustrating operational steps for detecting, geolocating, and communicating with tags utilizing an out-of-band system, in accordance with preferred embodiments of the present invention;

FIG. 7 depicts a flow chart of operations illustrating continued operational steps for detecting, geolocating, and communicating with tags utilizing an out-of-band system, in accordance with preferred embodiments of the present invention;

FIG. 11 depicts a flow chart of operations illustrating continued operational steps for detecting, geolocating, and communicating with tags utilizing an out-of-band system, in accordance with preferred embodiments of the present invention;

DETAILED DESCRIPTION OF PREFERRED EMBODIMENTS

The present invention provides methods and systems for obtaining a coherent frequency reference at the tag in an out-of-band tag system. The invention provides means for obtaining SAR-like spatial image resolutions in an out-of-band tag mode. An extension of several newly defined in-band tag modes to an out-of-band frequency transmission system concept is further provided. Finally, a dual-function tag, designed to implement both in-band and out-of-band radar/tag functions, is described.

Figure 1:
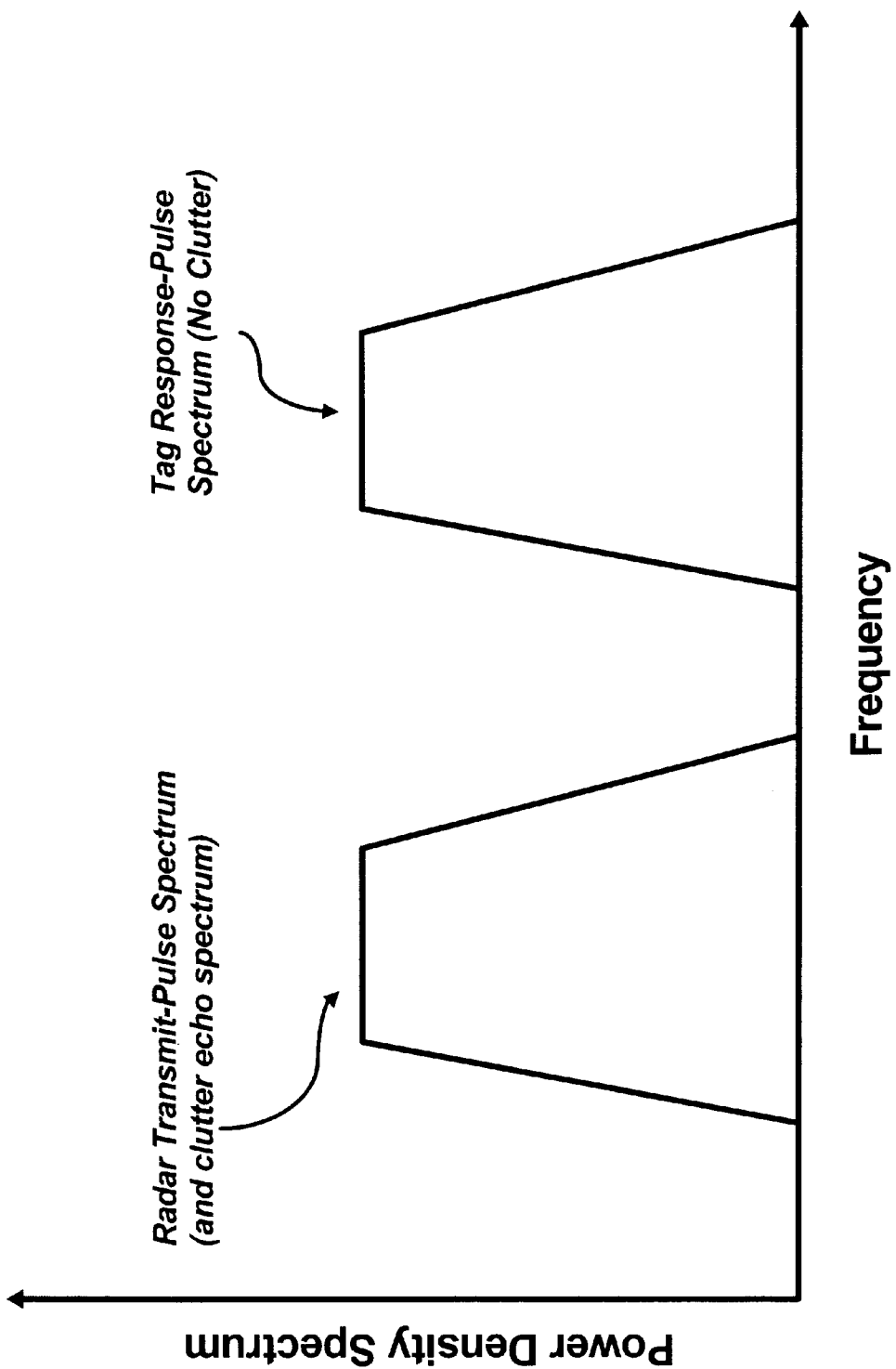
FIG. 1 depicts a graphical representation of power v. frequency for an out-of-band tag, wherein the spectra of transmit and echo pulses do not overlap in frequency.

Referring to FIG. 1, a graphical diagram is shown for frequency v. power density of a received radar transmission, and a tag's echo. Here a tag is caused to respond, with an "out-of-band" transmission, to a received transmission from a pulse radar. This means that the power-density frequency spectrum of the radar transmission and that of the tag response do not overlap. This tag response, in a different frequency band than the pulse radar's transmission, is referred to as "out-of-band" transmission (i.e., being "out-of-band" with respect to the frequency of a received radar pulse). This out-of-band response is an important feature of the present invention.

Because all stationary clutter echo received by the radar resides in the band of the downlink radar pulse, the tag's out-of-band echo will not have to compete against clutter at the radar receiver. The tag should now only have to compete against thermal noise. Unlike most tag operations presently in use, the video filter in the radar receiver can reject clutter. Elimination of stationary radar clutter enhances the sensitivity of the tag-to-radar link, permitting either a reduction of tag transmitting power or an increase in the uplink data rate.

In accordance with one method of the present invention, a tag must receive radar pulses, somehow recognize that it should respond to these pulses, translate the received pulse very accurately to a different uplink center frequency, and retransmit the pulse while keeping the radar pulse's chirp modulation in-tact. How this method is accomplished will now herein be described.

Figure 2:
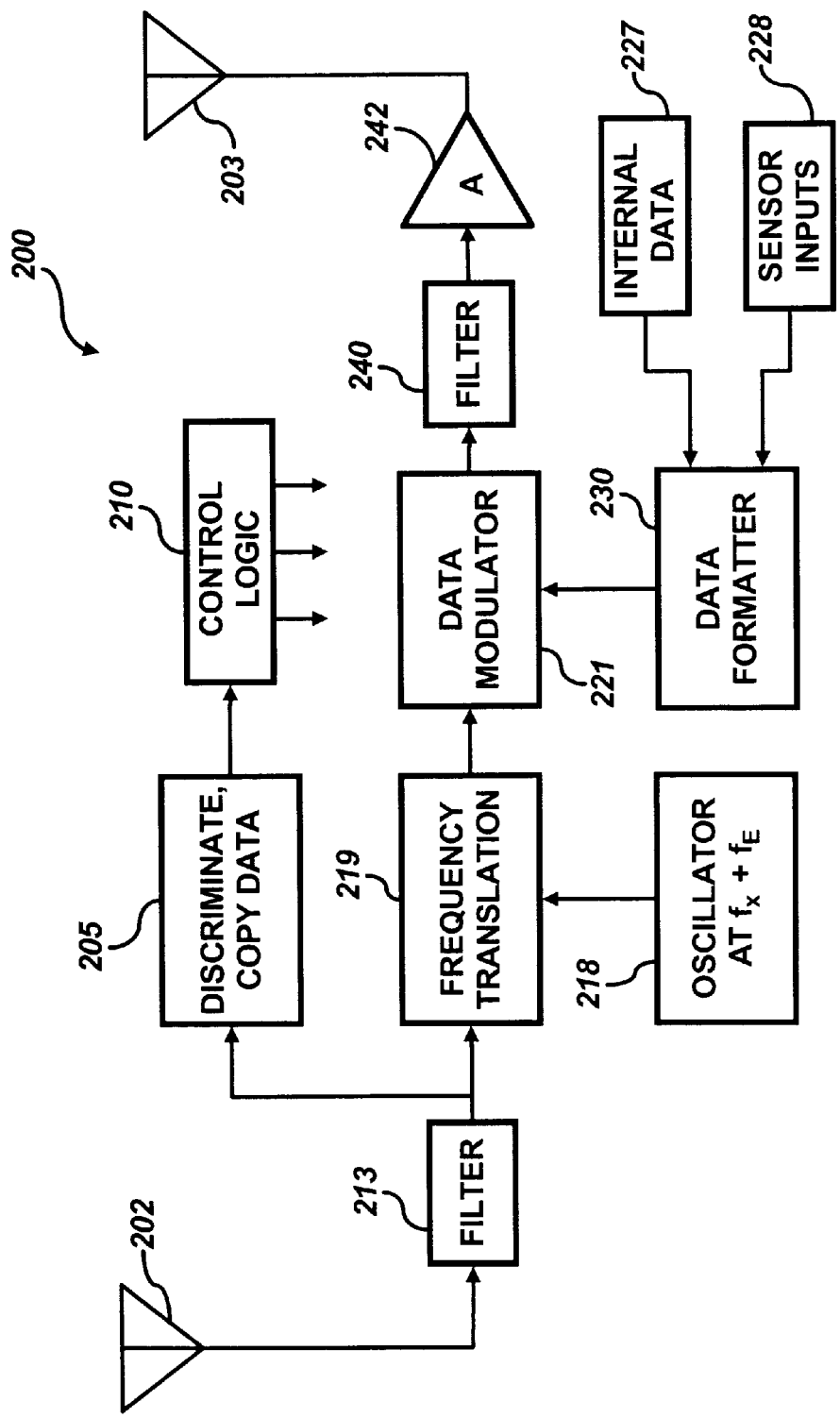
FIG. 2 illustrates a block diagram illustrating components of an out-of-band tag system in accordance with preferred embodiments of the present invention.

Referring to FIG. 2, a block diagram of one embodiment of a tag 200 is illustrated. The general architecture of the tag 200 depicted in FIG. 2 can generally be referred to as a "gain-block" architecture. This type of tag uses a modified version of the radar pulse as the echo signal. Such a tag normally does not require an oscillator at the radar's carrier frequency.

The tag should have discrimination circuitry 205 that determines which input pulses to respond to and which to ignore. A fully functional tag system will provide for a low-rate data downlink from the radar to the tag. Therefore, the radar must provide a way of sending downlink information, and the tag must be able to decode the downlink data. Downlink data can be used to control the operational mode of the tag (geolocation mode versus uplink-data mode), to command the tag into or out of a power conservation mode, or the cause the tag to perform some other particular action.

The magnitude of the signal received by the tag will be quite small, as low as −60 dBm or less. Required output transmit power may be of the order of +10 dBm or more. This increase in signal strength (i.e., approximately seven orders of magnitude) must be provided by amplification within the tag. So it is clear that if the tag is to operate in receive-while-transmit mode, significant isolation (perhaps 70 dB) will be required between the transmitter and the receiver to prevent the tag from jamming its own receiver. An alternative design, not shown-but well known in the art, can prevent the receiver and transmitter from operating simultaneously by switching back and forth between the receiver and transmitter numerous times over the duration of the radar pulse. With such a design, a delay line can be utilized to store a portion of the received pulse while the receiver is activated. The delay line can be then flushed during the time the transmitter is activated. Those skilled in the arts generally refer to this technique as "pulse chopping". Separate receive and transmit antennas 202 and 203 are illustrated in FIG. 2; however, if pulse chopping is utilized, it may be implemented with a single of sufficient bandwidth.

In a tag, mixing the received pulse against a tag oscillator 218 having a nominal frequency of $f_x$ and an unknown frequency error of $f_E$ performs the frequency translation operation. It is desirable that the tag's rf circuitry have sufficient bandwidth and linearity that the radar pulse's chirp modulation is not distorted. Two critical design parameters are the frequencies $f_x$ and $f_E$. As illustrated in FIG. 2, the tag oscillator 218 may be free-running. As will be described below, however, it is possible to devise a technique for synthesizing the tag oscillator 218 frequency from the radar transmitted pulse. The frequency $f_x$ must be chosen to assure that no in-band clutter exists at the radar receiver, after filtering through filter 213, and to accommodate other design features of the tag relating to possible self-jamming.

The frequency error $f_E$ will be directly related to $f_x$ in the following way $$f_E \approx \text{order of } \alpha_{ff} f_x,$$

where $\alpha_{ff}$ is the fractional frequency error of the oscillator. For example, if this fractional error is 20E-6, this implies that for every MHz of nominal offset, there will be 20 Hz of error in the oscillator frequency. In practice, accuracies of ±3E-6 can be readily achieved using temperature compensation techniques.

The tag's translation oscillator 219 must be sufficiently stable to support coherent integration times of the order of, at a minimum, 0.1 second at the radar's signal processor. This type of requirement translates to a specification on the oscillator's 218 phase-noise spectrum. The 0.1-second integration time is chosen under the assumption that the tag mode will be MTI (moving target indicator)-like in terms of using a relatively short azimuth integration time. There are a number of reasons for making the tag mode MTI-like: 1) short integration time conserves radar timeline, allowing large areas to be covered quickly; and 2) the frequency error $f_E$ is unknown and, if the oscillator is free-running, may require an image (or map) bandwidth of the order of kHz in order for the tag response to appear in the image.

For the initial response of the tag (geolocation mode), the data modulator 221 should not be used. It would be used, however, in the tag's data-uplink mode and any other modes requiring phase-code modulation. Output from data modulator 221 is fed to filter 240, which in turn is linked to an amplifier 242. Amplifier 242 is in turn linked to antenna 203. When commanded by the radar to send uplink data, the tag may either send internal data 227 (status or unit identification) or data coming from a sensor 228 such as environmental data associated with the tag's location (e.g., temperature, pressure, vital signs, etc.). Data may be modulated onto the response waveform on a pulse-by-pulse basis; that is, no intrapulse modulation would be used, and the phase of each separate pulse would be modulated to impress the uplink information on the waveform. If, for example, 0/π (bi-phase) phase coding is employed for a particular aperture, the tag could impress on the response pulses a sequence of n (i.e., an integer) phase states to encode the uplink information. Within the context of this assumption of bi-phase modulation, a great variety of encoding/decoding schemes are possible. The best scheme will be that which represents the best tradeoff among the following parameters: a) uplink data rate, b) tag transmitter power, and c) computational burden in the radar's signal processor.

Control logic 210 controls tag timing and modes and also coordinates data delivery from the data formatter 230 to the data modulator 221.

A key shortcoming that previously has been encountered with the out-of-band tag scheme heretofore described is the inaccuracy and finite stability-of a tag's free-running translation oscillator. The oscillator's 218 inaccuracy can be shown in some cases to cause a sizable and unknown offset (at least hundreds of Hz) in the tag's Doppler frequency. The offset can then be shown to result in a large uncertainty in the estimate of the tag's azimuth position (i.e., tens or hundreds of meters of error). An oscillator's 218 limited stability can also pose a limitation on an out-of-band system in that it can prevent SAR-mode-length integration times (1–10 seconds) and the corresponding SAR-mode resolutions (say, 1 m). In-band techniques, such as described in U.S. Pat. No. 5,486,830, suffer no such shortcoming.

The solution is to transfer a coherent reference to the tag that can be used to translate the radar pulse very accurately to the out-of-band frequency coordinate. This solution makes use of a free-running rf oscillator unnecessary and provides a way to exactly (or within the limits resulting from the finite signal-to-noise ratio of the transferred reference) mix the incoming pulse to the proper frequency while maintaining phase coherence with the radar. As described hereinafter, this solution is a key ingredient of this invention.

With the present out-of-band transmission method, it is proposed that the radar also send two sinusoidal tones at the same time the radar transmits the normal chirped pulse. The tones will begin at the time the normal transmit pulse begins and will end when the transmit pulse ends. These tones are placed at frequencies outside of the radar-pulse bandwidth, and they are separated from one another by a frequency that is either a sub-multiple of, or is exactly equal to the desired translation frequency. Recall that the "desired translation frequency" is the amount that we want the tag to move the chirp-pulse spectrum to put it at the desired out-of-band frequency coordinate. The transmission of these tones and a radar pulse is easily accomplished with the Multiplexed Chirp Waveform Synthesizer disclosed in U.S. patent application Ser. No. 09/238,762 of Peter Dudley et al, which invention is assigned to the Assignee of the instant invention. Other techniques for generating the pulses will be obvious to those of ordinary skill in the art.

Figure 3:
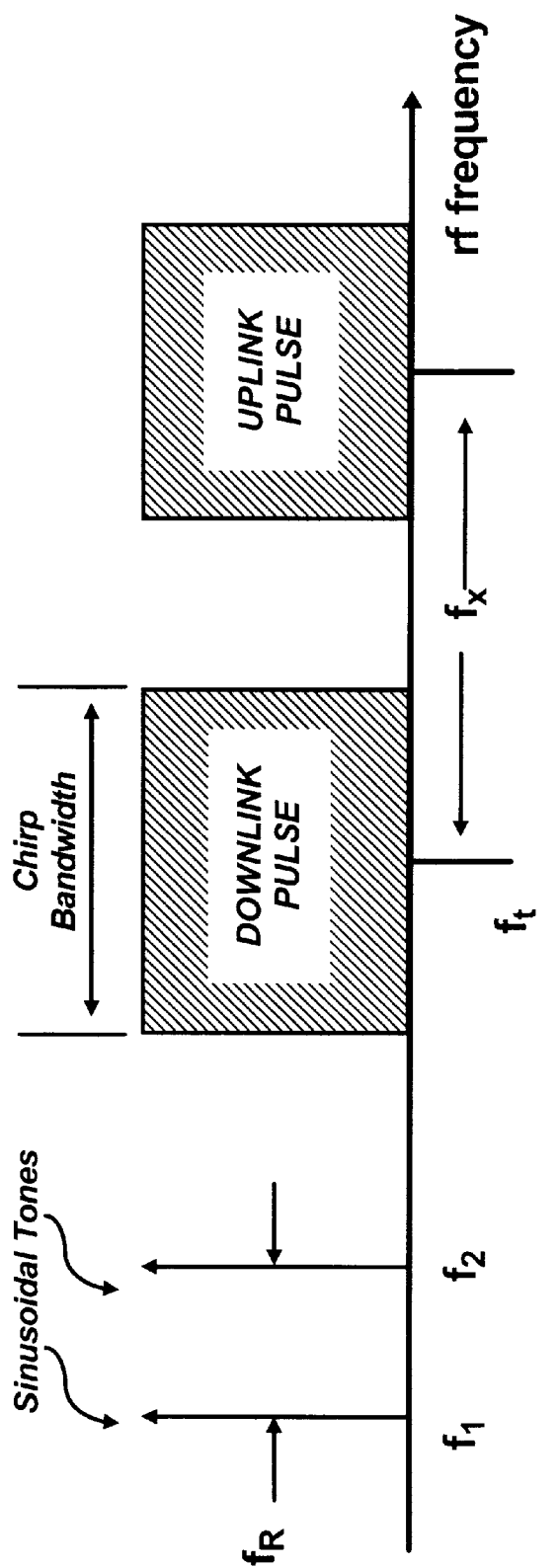
FIG. 3 depicts a pictorial representation of a frequency spectrum for a radar transmission wherein the radar transmits two additional tones, in accordance with preferred embodiments of the present invention.

FIG. 3 illustrates the power density spectrum of the signal to be transmitted from the radar. The two downlink tones and the uplink chirp spectrum are also shown.

The tone difference frequency, $f_R$, will be $$f_R = f_x / N_R \quad (1)$$

where $f_x$ is the desired translation frequency, and $N_R$ is the integer by which $f_R$ must be multiplied in the tag to produce $f_x$. Care will need to be taken in the radar signal processing of the echo and in keeping track of the absolute phases of the two tones and of the resulting recovered translation tone, over the aperture of pulses. It seems advisable for the radar waveform synthesizer to start both tones with a starting phase of zero degrees.

Figure 4:
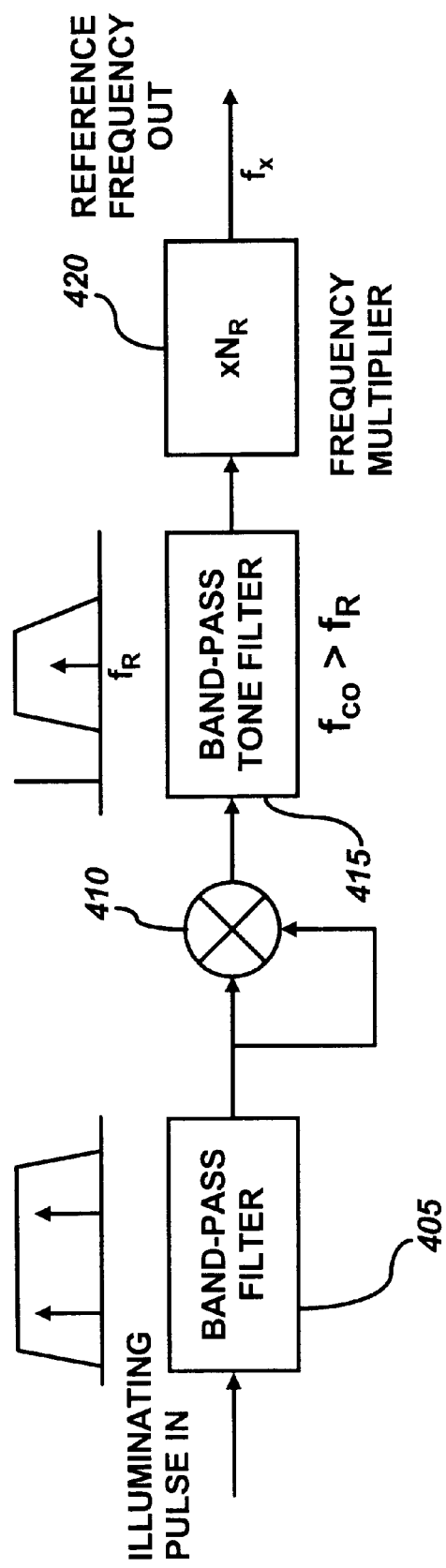
FIG. 4 illustrates a block diagram illustrating components for a coherent reference recovery method, in accordance with preferred embodiments of the present invention.

A basic approach for how the tag can process the incoming radar signal to obtain the translation frequency, $f_x$, is shown in the tone recovery circuit of FIG. 4, where the RF bandpass filter 405 passes the two received tones and rejects the incoming chirp pulse. The mixing operation 410 generates sum and difference frequencies of the tones, the difference frequency near baseband, and the sum frequency at about twice the nominal carrier frequency. The band-pass tone filter 415 passes only the baseband difference frequency, $f_R$, which is the sub-multiple of the offset frequency. The sub-multiple offset frequency is then multiplied to achieve the appropriate reference frequency to be used by the tag to mix the radar pulse to the desired out-of-band frequency coordinate.

If the tag is of the chopping gain-block type (i.e., using a delay line), then the tag generally cannot receive the tone continuously. This is because the tag receiver is turned off for one-half of each chopping cycle. It may be further inferred that the bandpass filter 405 must be fairly wide-band in order for its output transient to build up quickly enough to produce a steady-state carrier that will be present over a large percentage of the "receiver-on" state of the tag.

As an example, suppose that the delay line used in the tag has a 1 μs delay. Then, the tone-filter bandwidth should be at least 10 MHz to assure that the reference $f_x$ will be present most of the time when it is needed. Based upon downlink link-margin calculations for one candidate radar system, this value of bandwidth should be acceptable in terms of predicted signal-to-noise ratio at the tag. It is therefore reasonable to have a fairly long delay line in the tag of about 1 μs or more.

Where a chopping gain-block architecture is used in the tag, two approaches are possible: 1) recover the offset tone and mix the chirp pulse to the new frequency prior to the delay line, and 2) put both the chirp and the tones into the delay line and recover the offset tone after the delay line. The latter approach would require a wider-bandwidth delay line, so the first technique is preferred.

The operation of this invention is consistent with accepted radar principles, as shown by the following calculations:

Let $f_t$, $f_1$ and $f_2$ be the center frequencies, respectively, of the chirp pulse, the lower tone, and the upper tone (see FIG. 3) of a modern radar such as a synthetic aperature radar (SAR). Now, let us express the two transmitted tone voltages, $V_1(t)$ and $V_2(t)$, as $$V_1(t)=A_1 \cos(2\pi f_1 t+\phi_1) \text{ when } t_S \leq t \leq t_S+t_E,$$

$$V_1(t)=0 \text{ for all other values of } t, \quad (2)$$

and $$V_2(t)=A_2 \cos(2\pi f_2 t+\phi_2) \text{ when } t_S \leq t \leq t_S+t_E,$$

$$V_2(t)=0 \text{ for all other values of } t. \quad (3)$$

In equations (2) and (3) above, $\phi_1$ and $\phi_2$ are controllable starting phases. The signals $V_1$ and $V_2$ are time-gated sinusoids. In equations (2) and (3), $t_S$ is the start time of the transmitted pulse, and $t_E$ is the length of the transmitted pulse.

Figure 5:
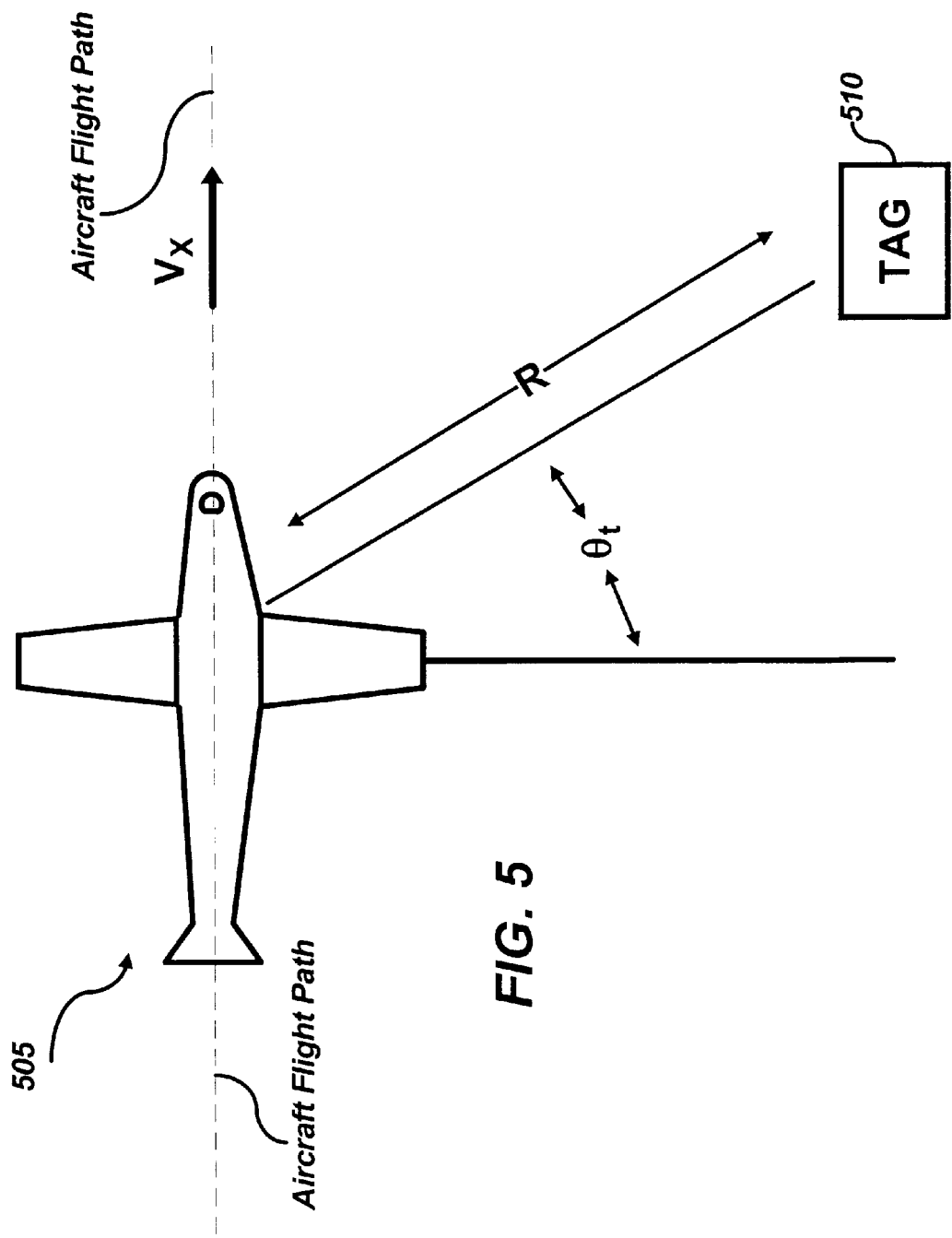
FIG. 5 depicts a plan view representation of an aircraft/tag geometry, in accordance with preferred embodiments of the present invention.

Referring to FIG. 5, the separation range between the radar 505 carried by an aircraft and the tag 510 on the ground is defined as R. Further, let the along-track velocity of the aircraft be $v_x$, designate the squint angle to the tag as $\theta_t$, and let c represent the speed of light. Finally, let us set the arbitrary phases of the sinusoidal tones to zero. Then, we can write the received tone signals $V_{r1}$ and $V_{r2}$ at the tag as $$V_{r1}(t)=A_1 \cos(2\pi[f_1+v_x f_1 \sin \theta_t/c]t) \text{ when } t_S+R/c \leq t \leq t_S+t_E+R/c,$$

$$V_{r1}(t)=0 \text{ for all other values of } t, \quad (4)$$

and $$V_{r2}(t)=A_2 \cos(2\pi[f_2+v_x f_2 \sin \theta_t/c]t) \text{ when } t_S+R/c \leq t \leq t_S+t_E+R/c,$$

$$V_{r2}(t)=0 \text{ for all other values of } t. \quad (5)$$

Mixing these two signals together and low-pass filtering the mixer output yields a difference-frequency signal, $V_{df}$, equal to $$V_{df}(t)=(A_1 A_2/2) \cos(2\pi[f_2-f_1][1+v_x \sin \theta_t/c]t). \quad (6)$$

Under the assumption that $N_R=1$ (to simplify calculations), the tag will use this sinusoidal signal to translate the radar pulse to the new out-of-band frequency. Therefore, the new out-of-band uplink center frequency transmitted from the tag will be $$f_{UL}=[f_t+f_2-f_1][1+v_x \sin \theta_t/c], \quad (7)$$

and the center frequency received at the radar will be $$f_{rr} = [f_t + f_2 - f_1][1 + v_x \sin\theta_t / c]^2 \quad (8)$$

$$\approx [f_t + f_2 - f_1][1 + 2v_x \sin\theta_t / c]. \quad (9)$$

In a manner well known in the art, the radar will translate the center frequency of this incoming echo downward by an amount equal to $f_t+f_2-f_1$. Therefore, the residual baseband offset frequency after the downconversion is $$f_{res}=[f_t+f_2-f_1][2v_x \sin \theta_t/c]. \quad (10)$$

Because on the right-hand-side of formula (10), all quantities are known ahead of time except the tag's azimuth coordinate $\theta_t$, and because $f_{res}$ is determined as part of conventional SAR processing, equation (10) clearly demonstrates that it is straightforward to extract this azimuth coordinate from the residual Doppler measurement made by the radar. With R and $\theta_t$ known, the position of the tag is known relative to the position of the radar, and this position may easily be identified on a SAR image. With modern SAR, the position of the tag can be determined in real time with an accuracy of about one foot.

If the two-tone method is to be effective, then sufficient power must be allocated to the two tones to allow the tag to both recover the translation tone cleanly and to transpond a relatively clean rendition of the chirp pulse. So, a sharing of the available transmitter power will have to be accomplished.

The signal-to-noise ratio of the recovered tone will depend primarily upon the bandwidth of the filter that isolates the two tones at the tag receiver front end. Recall that the bandwidth of the filter must be wide enough to allow the transient effects of the filter to subside in only a fraction of the length of the delay line, if a delay line is used in the tag.

Tags can operate in several modes. A complete set of out-of-band modes developed for use within the present invention is given in Table 1.

TABLE 1

Complete Set of Seven Out-of-Band Modes

| Mode | Use | Optional | Comments |
| --- | --- | --- | --- |
| TTI (Tag Target Indicator) | Geolocate tags, broad-area search (coarse resolution) | No | tag responds; no phase code |
| TTI/MA (Tag Target Indicator, Multiple Access) | Detect multiple tags in same coarse-resolution cell (meters or tens of meters in range and tens or hundreds of meters in azimuth); obtain geolocation update | Yes | tag uses randomly selected $0/\pi$ pseudo-noise (PN) code to respond; radar tries all codes in list |
| TDU (Tag Data Uplink) | Copy data from tags in coarse-resolution cell; obtain geolocation update | No | tag sends data using $0/\pi$ modulation; radar decodes data using track loop |
| TDU/MA (Tag Data Uplink, Multiple Access) | Copy data from multiple tags in same resolution cell; obtain geolocation update | Yes | tag uses randomly selected $0/\pi$ PN code to spread data; radar tries all codes in list |
| ST (SAR Tag) | Geolocate tag to SAR resolutions (1 m × 1 m) | No | tag responds; no modulation |
| ST/DU (SAR Tag, Data Uplink) | Send low-rate uplink data; obtain geolocation update (1 m × 1 m) | Yes | tag uses $0/\pi$ PN code to spread data |
| ST/UC (SAR tag, Unit Code) | Associate tag signatures with ID's; obtain geolocation update (1 m × 1 m) | No | tag sends ID-specific $0/\pi$ PN code; radar matches to known set of unit codes |

The "Optional" column indicates whether or not the listed mode is considered to be optional with respect to the basic set of modes required to detect the tag, coarsely geolocate the tag, copy uplink data from the tag, and accurately geolocate the tag.

Referring to FIGS. 6–13, flow diagrams are illustrated showing operational steps for using out-of-band modes as set forth above in Table 1 within a radar-tag system implementation of the present invention. Prior to fully describing features of the invention illustrated in these Figures, various aspects of the present invention now will be provided with additional detail.

In describing the present invention, we assume that a command downlink exists from the radar to the tag, whereby the radar can control the state of the tag. This downlink can be used to place the tag into either the in-band or out-of-band functional state and to further command the tag into any of the seven specified system modes (i.e., for the case of the out-of-band modes described in Table 1 herein).

The seven out-of-band system modes can be grouped according to two basic types, i.e., those modes that perform only a geolocation function (TTI, TTI/MA, ST) and those modes that perform both information uplinking and geolocation functions (TDU, TDU/MA, ST/DU, and ST/UC). Equivalents of both the ST geolocation mode and the ST/DU data-uplinking mode have been described previously in. U.S. Pat. No. 5,486,830 for an in-band radar/tag system. Both of these modes employ relatively long aperture times (i.e., seconds), as does the new mode ST/UC. The other modes (TTI, TTI/MA, TDU, and TDU/MA) are described herein in accordance with the methods and systems of the present invention. All of these latter four modes generally employ relatively shorter aperture times (i.e., normally a fraction of a second). The TTI mode possesses an analog in the common Moving-Target-Indication (MTI) radar technique.

TTI, TTI/MA and ST are modes that produce maps or images. In these modes, geolocation of tags can be performed by detecting the presence of the tags on either the TTI map or the ST image and determining each tag's range-azimuth coordinate just as one would determine the geographical location of a moving target on a Moving-Target-Indication radar map, or of a stationary target on the radar's (SAR) fine-resolution image. The primary difference between TTI and ST modes lies in the fact that the range-azimuth resolution of the TTI map is coarse, while the resolution of the ST map is very fine (i.e., approximately 1 m×1 m).

In the TTI/MA mode, uplink data is not sent. A randomly chosen pseudo-noise, pulse-to-pulse phase-code sequence, however, is employed by the tag to enable the radar to distinguish among returns from multiple tags that appear in the same coarse range/azimuth cell.

In the uplink-communications modes (TDU, TDU/MA and ST/DU), informational data can be impressed on the pulses transmitted by the tag. In the TDU/MA mode, not only are uplink data sent, but also the uplink data symbols can be spreading using a (multiplicative) pseudo-noise phase code.

The ST/UC mode is somewhat different from the other modes in that each tag sends a PN code that has a one-to-one mapping with that tag's ID or serial number. The ST/UC mode is utilized to permit the radar to associate geographical locations with tag ID or serial numbers for the case of multiple tags contained in the same coarse-resolution (as in the TTI mode) cell.

Some discussion of the processing, by the radar, of the tag echoes is necessary for a further understanding of the present invention described herein. The processing techniques for both ST and ST/DU are adequately described in U.S. Pat. No. 5,486,830, which is incorporated herein by reference. Radar processing for TTI, TTI/MA and ST/UC modes is essentially identical to ST processing, which again is described in U.S. Pat. No. 5,486,830. TTI-mode processing, however, can be greatly simplified because no azimuth focusing is required as is the case in ST/UC, which is a SAR mode.

Processing for the tag Data Uplink modes (TDU and TDU/MA) can be implemented in a manner essentially identical to that described for ST/DU (data-uplinking mode) in U.S. Pat. No. 5,486,830. An alternative and superior method for processing in TDU and TDU/MA modes has been developed in the course of work performed for the assignee of this patent, which employs a range/Doppler data-tracking loop. In this superior method, the tracking loop can be initialized utilizing range/Doppler coordinates for each tag obtained from execution of either TTI or TTI/MA modes. The tracking loop then adjusts both the range delay and electrical phase of the echo signal, on each successive pulse, in order to decode data symbols and to track variations in both range and Doppler over the duration of the radar's aperture.

Finally, a description is required to explain how geolocation of the tag is performed by the radar in the following modes—TDU, TDU/MA, and ST/DU. For these three modes, once the uplink data stream has been decoded by the radar's signal processor, the location of the tag is determined by inspecting the history of the tracking-loop-error signal (range and Doppler-frequency dimensions) over the duration of the aperture.

Referring now to FIG. 6, illustrated is a flow chart of operational steps for detecting, geolocating, and communicating with tags utilizing an out-of-band system, in accordance with preferred embodiments of the present invention. As depicted at block 610 of FIG. 6, a radar wakes up tags utilizing a TTI (Tag Target Indicator) mode command. Tags located within range of the radar's challenge respond in out-of-band mode, as illustrated at block 620, without a particular phase code. The radar can then form a TTI map of the challenge area, as described at block 630.

FIG. 7 depicts a flow chart of operations illustrating continuing operational steps for detecting, geolocating, and communicating with tags utilizing an out-of-band system, in accordance with preferred embodiments of the present invention. The operational steps illustrated in FIG. 7 may be processed sequentially after the operational steps depicted in FIG. 6. Referring to FIG. 7, after initiating an initial tag challenge as outlined in FIG. 6, a radar can next detect specific tag TTI responses, as indicated at block 710, on the newly created TTI map. The radar thereafter obtains coarse (meters or tens of meters in range and tens or hundreds of meters in azimuth) geolocation for tags responsive to the radar, as depicted at block 730. If multiple tags reside in the same coarse-resolution cell, then detection of all tags may not be feasible.

Figure 8:
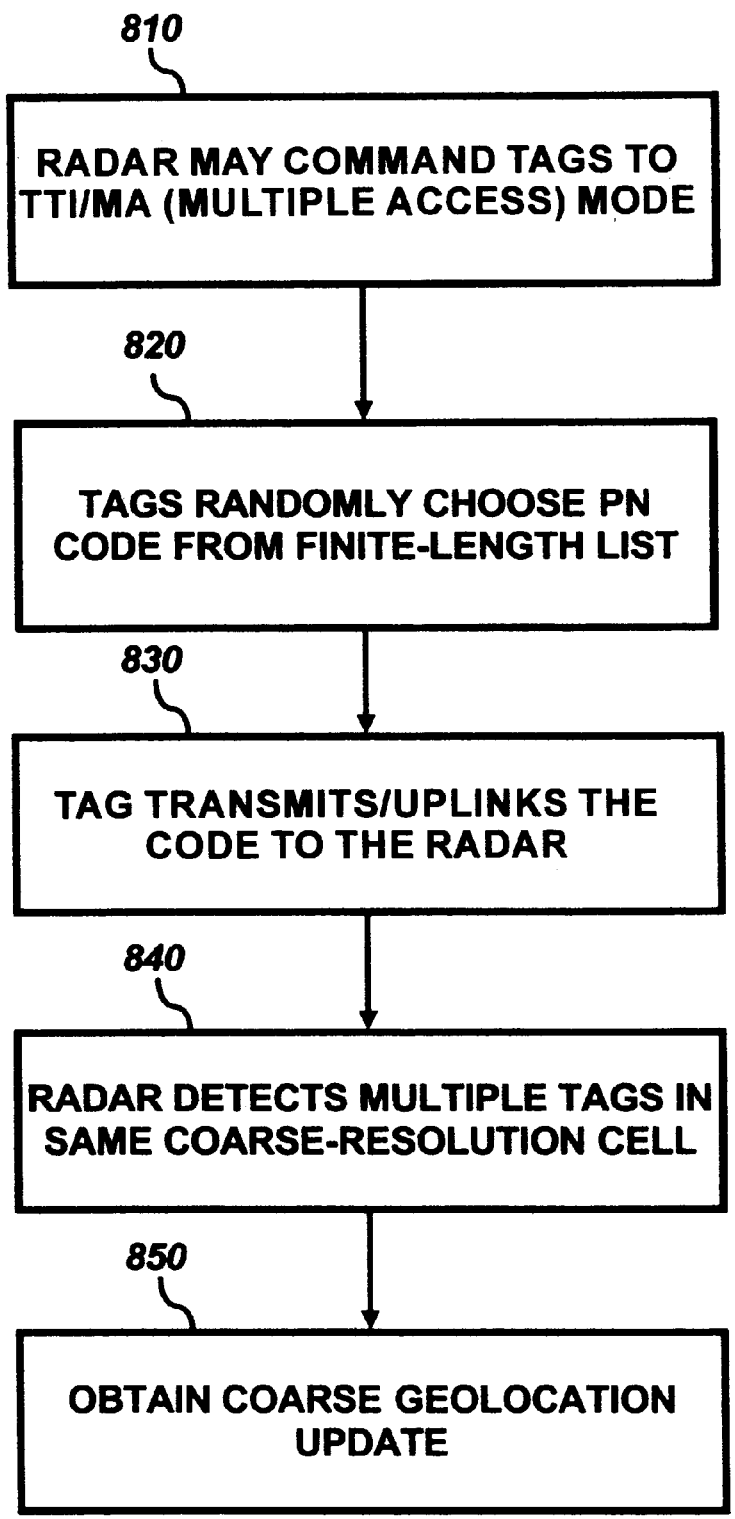
FIG. 8 illustrates a flow chart of operations illustrating continued operational steps for detecting, geolocating, and communicating with tags utilizing an out-of-band system, in accordance with preferred embodiments of the present invention.

FIG. 8 depicts a flow chart of operations illustrating continuing operational steps for detecting, geolocating, and communicating with tags utilizing an out-of-band system, in accordance with preferred embodiments of the present invention. The operational steps illustrated in FIG. 8 may be processed sequentially after the operational steps depicted in FIG. 7. Referring to FIG. 8, the radar can optionally command tags to TTI/MA (Multiple-Access) mode, as illustrated at block 810. This mode permits detection of multiple tags in the same coarse-resolution cell. In response to the operation described at block 810, tags may randomly choose a pseudo-noise (PN) code from a finite-length list, as indicated at block 820. Thereafter, as described at block 830, the tags may send (i.e., transmit/uplink) the PN code to the radar. Then, as indicated at block 840, the radar may detect multiple tags in the same coarse-resolution cell. A geolocation update is the obtained, as illustrated at block 850.

Figure 9:
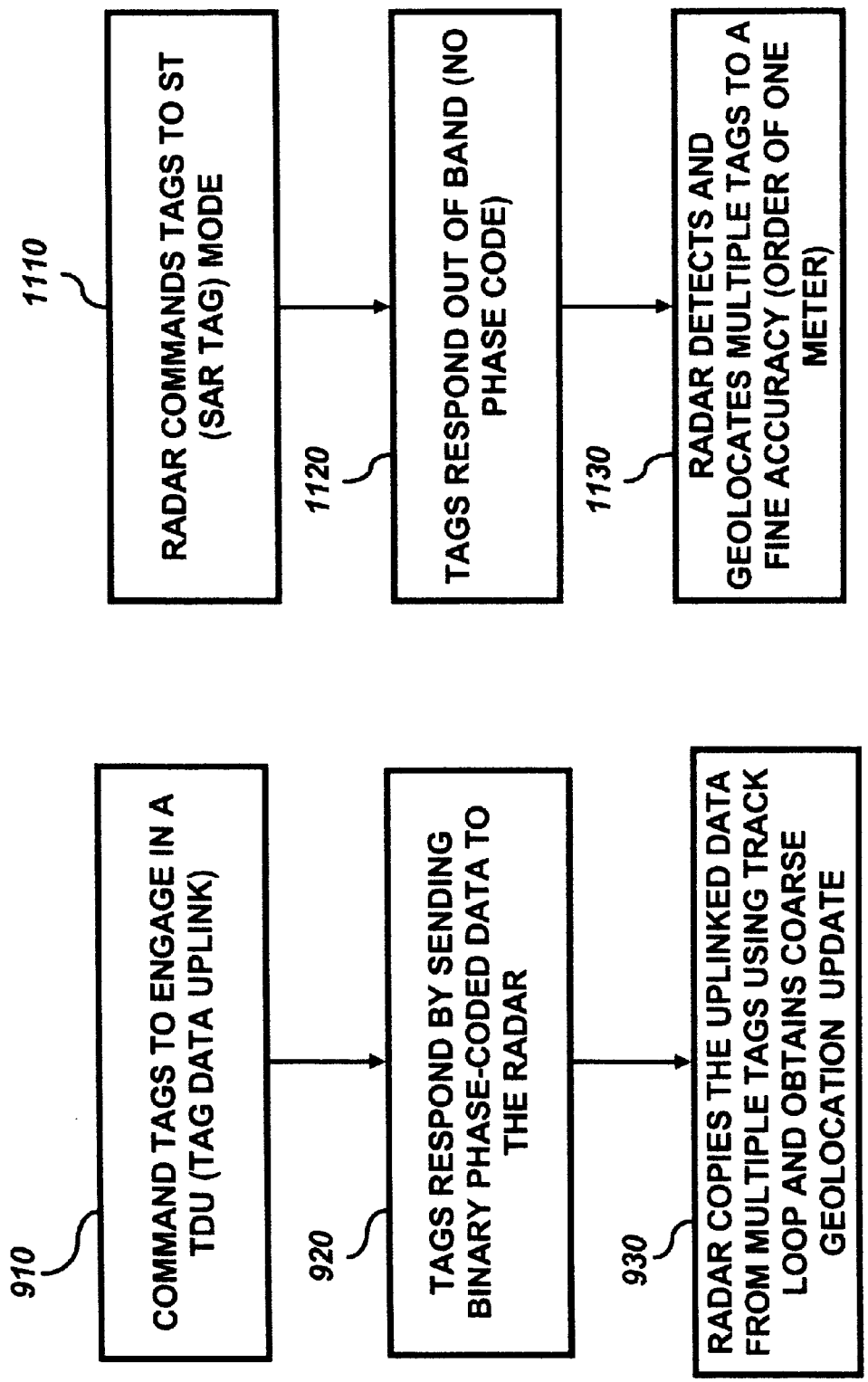
FIG. 9 depicts a flow chart of operations illustrating continued operational steps for detecting, geolocating, and communicating with tags utilizing an out-of-band system, in accordance with preferred embodiments of the present invention.

FIG. 9 depicts a flow chart of operations illustrating continuing operational steps for detecting, geolocating, and communicating with tags utilizing an out-of-band system, in accordance with preferred embodiments of the present invention. The operational steps illustrated in FIG. 9 may be processed sequentially after the operational steps depicted in FIG. 8. Referring to FIG. 9, following either the process described in FIG. 8 or immediately following the processing of the operational steps described in FIG. 7, commanded tags may engage in a TDU (Tag Data Uplink) mode, as depicted at block 910. The tags then respond by sending binary phase-coded data to the radar, as illustrated at block 920. The radar can then copy the uplinked data from multiple tags utilizing a range/Doppler track loop and obtain a geolocation update, as depicted at block 930. If multiple tags reside in a single resolution cell, copying uplinked data from all tags may not be feasible.

Figure 10:
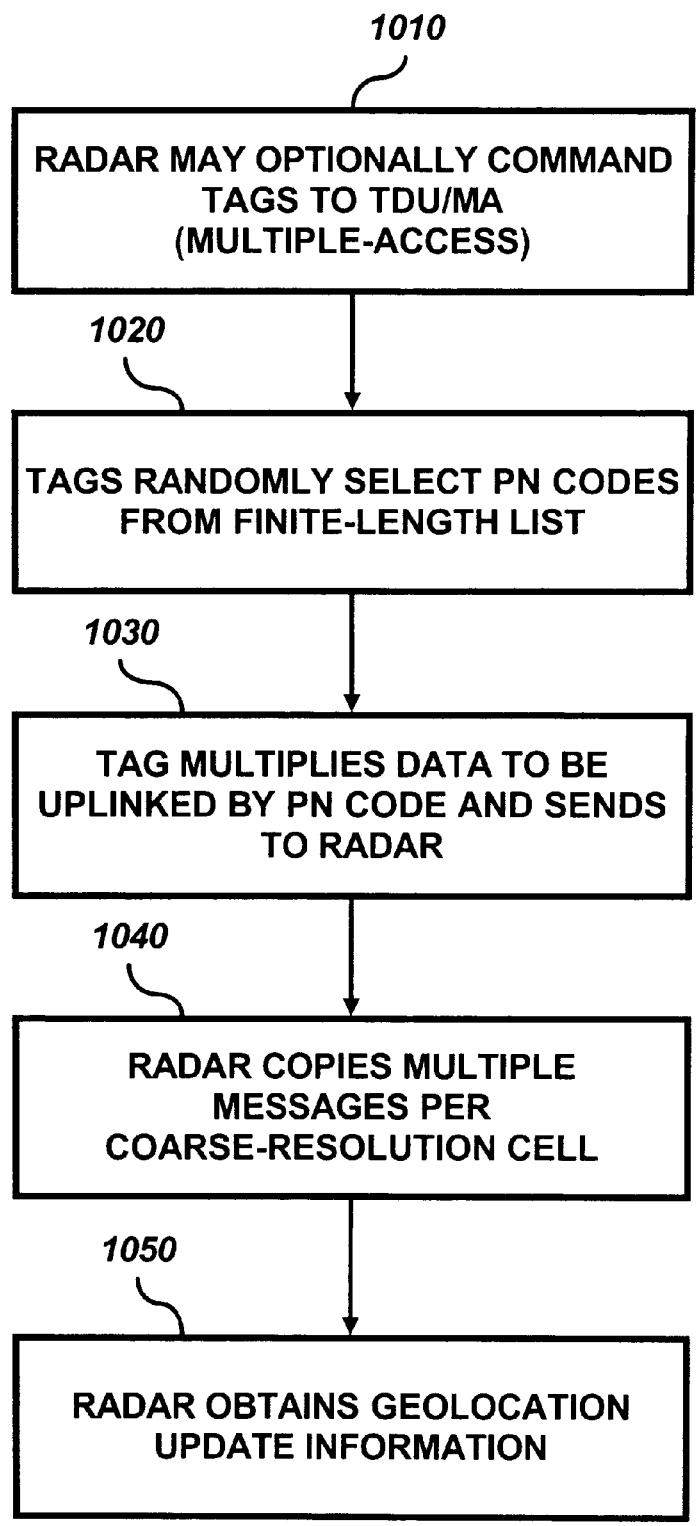
FIG. 10 illustrates a flow chart of operations illustrating continued operational steps for detecting, geolocating, and communicating with tags utilizing an out-of-band system, in accordance with preferred embodiments of the present invention.

FIG. 10 depicts a flow chart of operations illustrating continuing operational steps for detecting, geolocating, and communicating with tags utilizing an out-of-band system, in accordance with preferred embodiments of the present invention. The operational steps illustrated in FIG. 10 may be processed sequentially after the operational steps depicted in FIG. 9. Referring to FIG. 10, after copying uplinked data, the radar may optionally command tags to TDU/MA (Multiple-Access) mode, as described at block 1010. The tags may then randomly select PN codes from the finite-length list as illustrated at block 1020, and then send data, spread by this code, to the radar, as depicted at block 1030. The radar then copies multiple messages per coarse-resolution cell, as described at block 1040, and obtains geolocation update information, as described thereafter at block 1050. This mode can provide a way to copy data from tags that are densely spread (i.e., more than one per course resolution cell).

FIG. 11 depicts a flow chart of operations illustrating continuing operational steps for detecting, geolocating, and communicating with tags utilizing an out-of-band system, in accordance with preferred embodiments of the present invention. Referring to FIG. 11, immediately following processing of the operations described in either FIGS. 9 or 10, the radar can command tags to ST (SAR Tag) mode, as indicated at block 1110. The tags then respond "out-of-band," with no phase code, as described at block 1120. The radar then detects and geolocates multiple tags to a 1 m×1 m relative accuracy, as indicated at block 1130.

Figure 12:
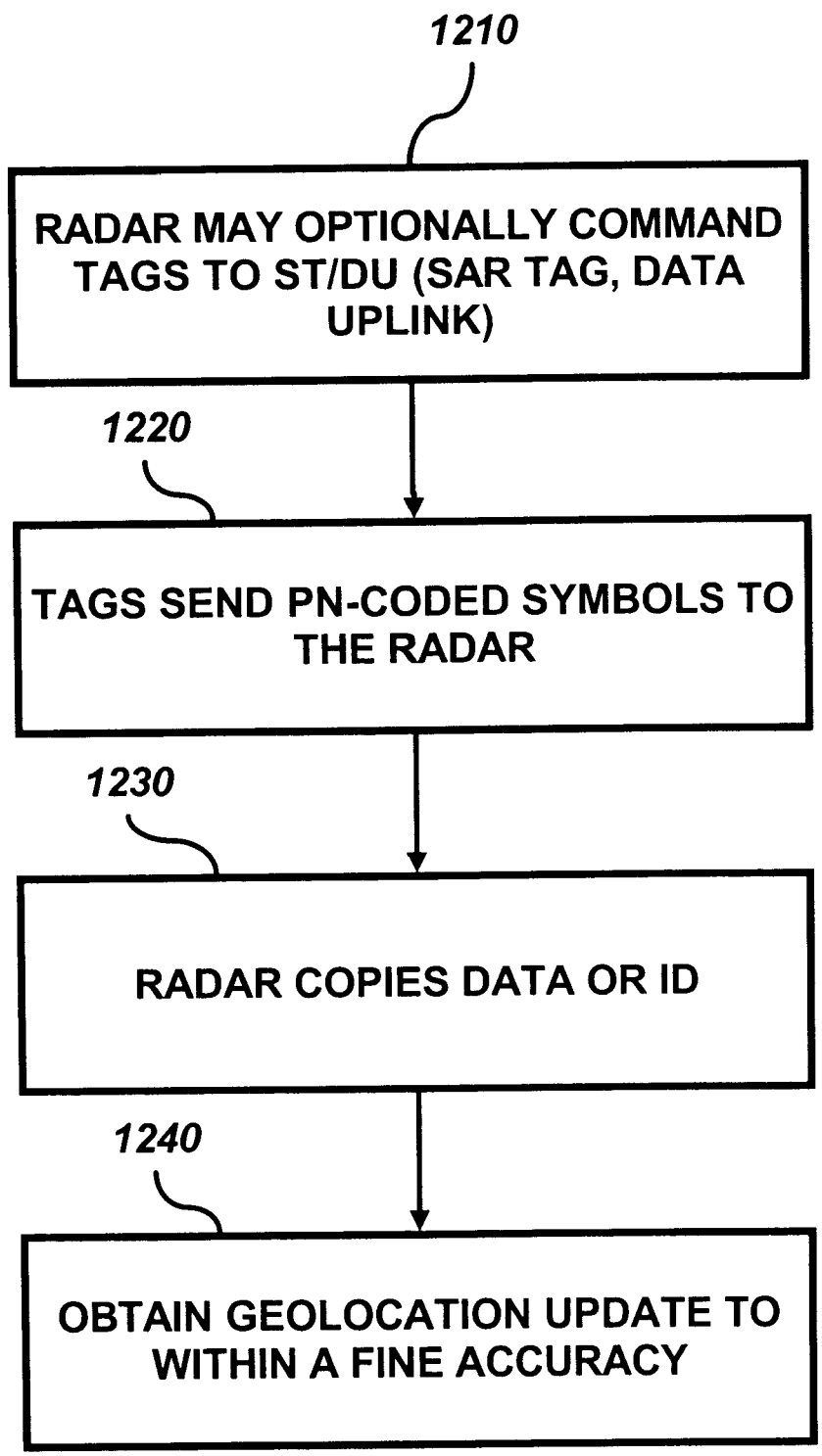
FIG. 12 illustrates a flow chart of operations illustrating continued operational steps for detecting, geolocating, and communicating with tags utilizing an out-of-band system, in accordance with preferred embodiments of the present invention.

FIG. 12 depicts a flow chart of operations illustrating continuing operational steps for detecting, geolocating, and communicating with tags utilizing an out-of-band system, in accordance with preferred embodiments of the present invention. The operational steps illustrated in FIG. 12 may be processed sequentially after the operational steps depicted in FIG. 11. Referring to FIG. 12, the radar may optionally command tags to a ST/DU (SAR Tag, Data Uplink) mode, as indicated at block 1210. If so commanded, tags send PN-coded symbols to the radar, as described at block 1220. The radar may then copy data or ID, as illustrated at block 1230, and obtain a geolocation update (e.g., to within 1 m×1 m relative accuracy), as indicated at block 1240. This mode provides both a very sensitive data uplink and a fine-accuracy geolocation estimate.

Figure 13:
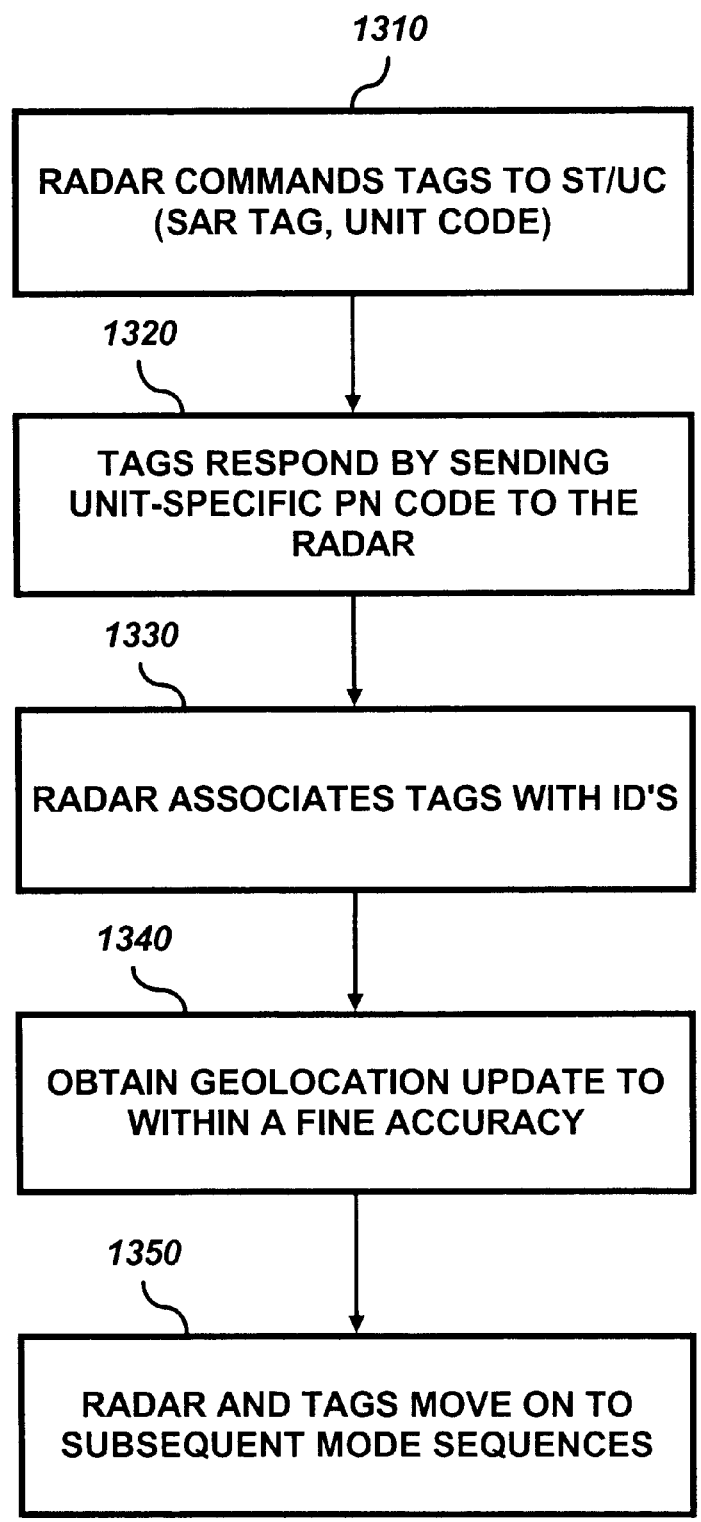
FIG. 13 depicts a flow chart of operations illustrating continued operational steps for detecting, geolocating, and communicating with tags utilizing an out-of-band system, in accordance with preferred embodiments of the present invention.

FIG. 13 depicts a flow chart of operations illustrating continuing operational steps for detecting, geolocating, and communicating with tags utilizing an out-of-band system, in accordance with preferred embodiments of the present invention. Referring to FIG. 13, immediately following processing of the operational steps described in either FIGS. 11 or 12, the radar can command tags to ST/UC (SAR Tag, Unit Code) mode, as illustrated at block 1310. Tags respond by sending a unit-specific PN code to the radar, as illustrated at block 1320. The radar then associates tags with ID's as indicated at block 1330 and obtains a geolocation update (to within 1 m×1 m relative accuracy), as depicted at block 1340. The radar and tags may then move on to subsequent mode sequences as indicated at block 1350, including each sequence of operational steps described in FIGS. 6 to 12.

Figure 14:
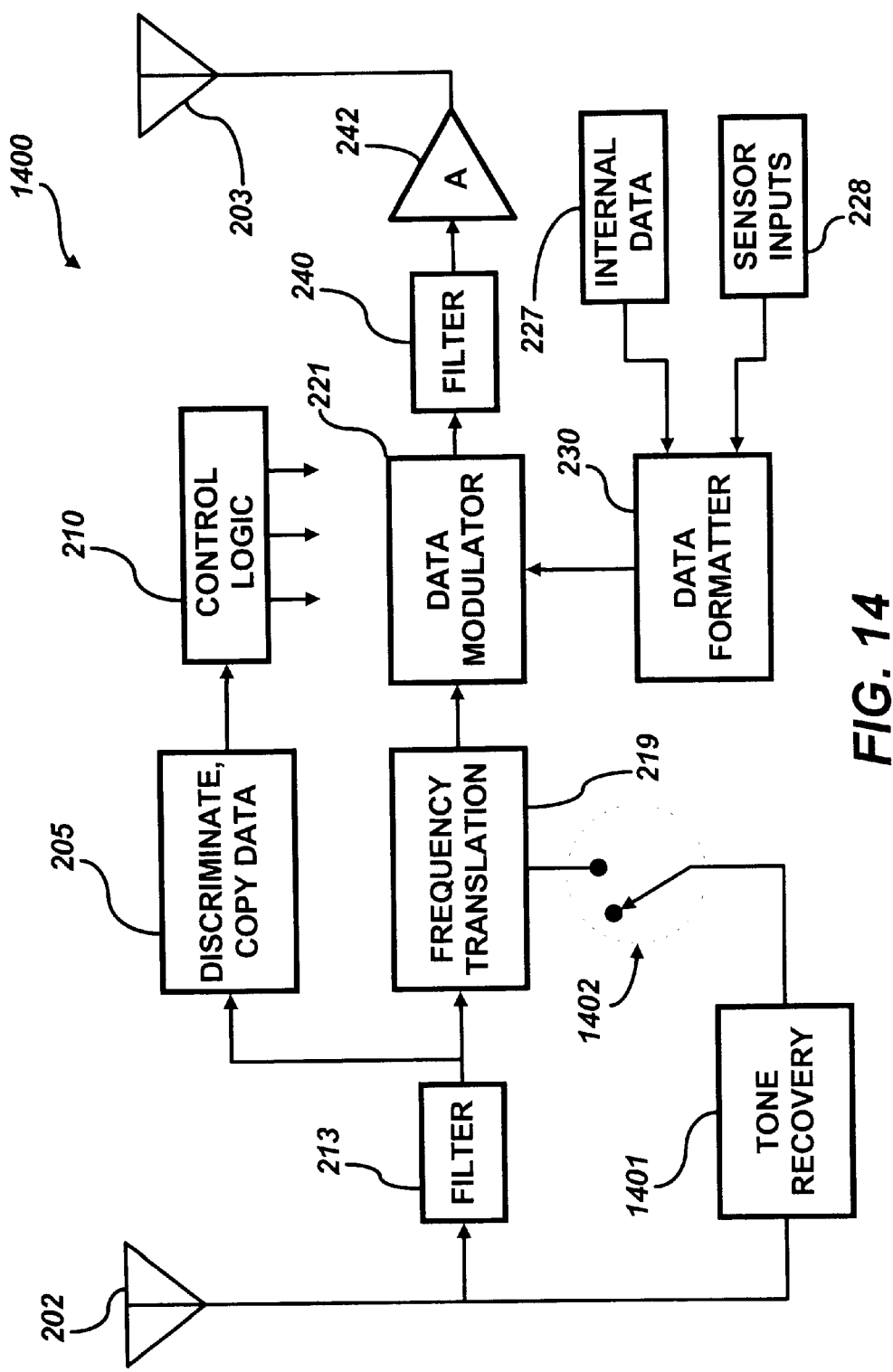
FIG. 14 illustrates a block diagram illustrating components of a combined out-of-band, in-band tag system in accordance with alternative preferred embodiments of the present invention.

FIG. 14 depicts a block diagram illustrating that a single tag 700 could provide both in-band and out-of-band functions. Note that in FIGS. 2 and 14 analogous parts are indicated by identical reference numerals. Thus, for example, data formatter 230 of FIG. 14 is analogous to data formatter 230 of FIG. 2. Much of the tag 1400 is similar in architecture to the out-of-band tag 200 illustrated in FIG. 2. The purpose of FIG. 14 is to provide a block diagram of how the tone recovery circuit of FIG. 4 interacts with the tag of FIG. 2, and to show a tag constructed to perform both in-band and out-of-band-functions.

The tone recovery circuit of FIG. 4 is represented as unit 1401 of FIG. 14. An input port (i.e., switch 1402) to the frequency translation unit 219 may be deactivated (as shown) for the in-band function and activated for the out-of-band function. In the deactivated position, tag 1400 operates in the manner of the in-band tag of U.S. Pat. No. 5,486,830. Frequency translation unit 219 is connected to tone recovery unit 1401 through switch 1402, which switch may be activated by control logic 210 in response to a command received by the tag from the radar. Other general operational aspects of the tag's 1400 operation in in-band mode are well known in the art. Amplitude chopping of an incoming radar pulse is not shown. The method of chopping is described in detail in U.S. Pat. No. 5,486,830 and is herein incorporated by reference. Finally, FIG. 14 shows two antennas simply for convenience. When the amplitude-chopping scheme is used to prevent tag oscillation, a single antenna can be used, as taught in U.S. Pat. No. 5,486,830.

The operational steps illustrated in FIGS. 6 to 13 herein can be implemented as a program product based on one or more software modules. In programming, the term "module" generally refers to an assemblage or group of routines, subroutines and data structures that can perform particular tasks. Such routines; subroutines and data structures may also implement particular abstract data types. A typical module may include an interface, which enumerates the constants, variables, data types, routines or subroutines that can be accessed by other modules or routines and subroutines.

A module may also include an implementation portion that is private in nature and generally accessible only by that module and which contains the source code that actually implements the routines in the module. Thus, a program product implementation of the operational steps illustrated in FIGS. 6 to 13 may be configured as a single module or a group of modules, depending on the needs and requirements of the program product designer. Such a program product may be implemented in a variety of forms, including, but not limited to signal-bearing media, including transmission media and recordable media, such as memory devices found, for example, in tags.

For purposes of the foregoing discussion, a number of technical assumptions can be made, but are not meant to limit the scope of the present invention. The radar's PRF can be slaved to a stable clock in such a manner as to support coherent integration of the tag's translated echo. Additionally, the tagged object remains on the ground and does not move. Also, the range and azimuth processing for the tag system geolocation modes are analogous to normal MTI-mode and SAR-mode processing; however, the radar receiver's local oscillator can be tuned to the expected offset frequency, $f_t+f_x$, where $f_t$ is the radar transmit frequency, as defined herein, and $f_x$ is the nominal frequency of the tag's translation oscillator.

A typical SAR system utilizing the out-of-band tag system of this invention might operate at approximately the following frequencies: $f_t$=15 GHz; chirp bandwidth=100 MHz; $f_1$=14.6 GHz; and $f_2$=14.8 GHz.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for communicating between radars and tag devices, said method comprising the steps of:

receiving at a tag pulse radar signals transmitted from a radar, said radar signals comprising a pulsed waveform transmitted at first frequency $f_t$ and having a bandwidth extending around $f_t$, wherein frequencies outside the bandwidth are defined as out-of-band;

processing said pulse radar signals at the tag to generate a stable reference frequency, said reference frequency being derived only from said radar signals;

shifting said received radar signal by a function of said reference frequency to form an out-of-band tag signal; and transmitting said tag signal to said radar.

2. The method of claim 1 further comprising:

receiving reflected pulse radar signals at said radar and processing said signals to generate a radar image;

receiving said tag signal at said radar; and said radar using said received tag signal to locate said tag within said radar image.

3. The method of claim 1 wherein said out-of-band frequency is an integer multiple of said reference frequency.

4. The method of claim 1 wherein said transmitted pulse radar signal further comprises two out-of-band downlink tones and said reference frequency is the frequency difference between said tones.

5. A method for locating and communicating with at least one tag, said method comprising the steps of:

transmitting a radar signal from a radar to a general geographic location containing at least one tag, said radar signal comprising a radar pulse centered at a first frequency and two sinusoidal tones; and receiving, at said radar, tag data retransmitted from at least one tag at a second frequency that is out-of-band with respect to said radar pulse, wherein the second frequency is a predetermined function of the frequency difference between the two sinusoidal tones.

6. The method of claim 5 further comprising the steps of:

receiving said transmitted radar signal at a tag;

processing at said tag said radar signal to determine the frequency difference between the two sinusoidal tones in said pulsed radar signal;

determining at said tag said second frequency; and transmitting tag data to said radar at said second frequency.

7. The method of claim 6 wherein said second frequency differs from said first frequency by a multiple of said frequency difference.

8. The method of claim 6 wherein said tag data comprises at least one of geolocation sequences and environmental information.

9. The method of claim 8 wherein said tag data comprises environmental information.

10. The method of claim 7 wherein said tag data further comprises geolocation sequences.

11. The method of claim 5 further comprising the step of:
processing said tag data to determine environmental information and/or tag internal data associated with said tag's geolocation.

12. A system for communicating between radar and tag devices, said system comprising:
a tag receiver receding radar pulse signals comprising a radar pulse centered at a first frequency and two out-of-band sinusoidal tones, wherein frequencies not in the frequency range of said radar pulse are out-of-band;
a tag processor processing said radar pulse signals to determine an out-of-band second frequency that differs from said first frequency by a predetermined function of the frequency difference between the two sinusoidal tones; and
a tag transmitter for transmitting data from said tag at said out-of-band second frequency; wherein said second frequency is not dependent upon a tag local oscillator.

13. The system of claim 12 further comprising:
a radar transmitter for transmitting said radar signal at said first frequency; and
a radar receiver for receiving said data transmitted at an out-of-band second frequency from said tag.

14. The system of claim 12 wherein said tag processor comprises a mixer to extract a difference frequency from said two sinusoidal tones in the radar pulse; and a frequency multiplier to multiply the difference frequency by a predetermined multiple.

15. The system of claim 14 wherein said radar pulse signals comprise a chirp radar pulse having a bandwidth extending about said first frequency, and wherein the second frequency is out-of-band relate to said radar pulse.

16. The system of claim 14 further comprising:
a synthetic aperture radar transmitter for transmitting said pulse signals, wherein said radar pulse is a chirped synthetic aperture radar signal at said first frequency; and
a synthetic aperture radar receiver for receiving reflected target information at said first frequency and said data from said tag at said second frequency, said receiver further comprising means for forming a synthetic aperture radar image from said information, and means for using said received data to accurately locate the position of said tag on said image.

17. A program product for communicating between radars and tag devices, wherein said program product resides in computer memory in a computer, said program product comprising:
a module residing in computer memory for receiving radar pulse signals from a radar at a tag;
a module residing in computer memory for processing said radar pulse signals to determine an out-of-band frequency from parameters of said radar pulse for transmission of tag data back to said radar from said tag; and
a module residing in computer memory for transmitting tag data to said radar by said tag at said out-of-band frequency.

18. The program product of claim 17 further comprising:
a module residing in computer memory for receiving tag data transmitted at said out-of-band frequency at said radar.

19. The program product of claim 17 wherein said out-of-band frequency is determined by extracting a reference frequency from said radar pulse and rendering an out-of-band frequency known by said radar based on said reference frequency.

20. A tag comprising:
a receiver for receiving radar pulses transmitted from at least one radar, said pulses being received at a first frequency;
a tone recovery module for extracting a reference frequency from the transmitted radar pulses;
a frequency translation module for generating a second frequency that is the sum of the received first frequency and a multiple of said reference frequency; and
a transmitter for transmitting said received radar pulses from the tag to at least one radar at said second frequency, wherein no local oscillator at said tag is used in the generation of said second frequency.

* * * * *